United States Patent [19]

Wada et al.

[11] Patent Number: 5,046,236
[45] Date of Patent: Sep. 10, 1991

[54] METHOD OF FABRICATING CERAMIC ELECTRONIC COMPONENT OF MULTILAYERED TYPE

[75] Inventors: Nobuyuki Wada; Yoshiaki Kohno; Noriyuki Kubodera, all of Nagaokakyo, Japan

[73] Assignee: Murata Manufacturing Co., Ltd., Japan

[21] Appl. No.: 595,392

[22] Filed: Oct. 10, 1990

[30] Foreign Application Priority Data

Oct. 11, 1989 [JP] Japan .................................. 1-264579

[51] Int. Cl.$^5$ ...................... H01G 7/00; H01C 17/00
[52] U.S. Cl. .................................. 29/610.1; 29/592.1; 29/25.42
[58] Field of Search ................. 29/25.42, 592.1, 610.1; 264/61; 361/321

[56] References Cited

U.S. PATENT DOCUMENTS

| | | | |
|---|---|---|---|
| 3,179,862 | 4/1965 | Dubilier | 29/25.42 |
| 3,504,244 | 3/1970 | Minoruchiba et al. | 29/25.42 |
| 3,784,887 | 1/1974 | Sheard | 29/25.42 |
| 4,568,384 | 2/1986 | Maher | 29/25.42 |
| 4,942,496 | 7/1990 | Arakawa et al. | 29/25.42 |

*Primary Examiner*—P. W. Echols
*Attorney, Agent, or Firm*—Ostrolenk, Faber, Gerb & Soffen

[57] ABSTRACT

A method of fabricating an electronic component of multilayered type comprising the steps of sequentially forming and laminating a plurality of metal films respectively having different metal compositions for constituting the alloy composition of an inner electrode by the thin film forming process to obtain a laminated metal film, laminating a plurality of ceramic green sheets through laminated metal films such that the laminated metal film is arranged between the ceramic green sheets, sintering a laminated body thus obtained and alloying the laminated metal films to form a plurality of inner electrodes each composed of an alloy.

7 Claims, 4 Drawing Sheets

METHOD OF FABRICATING CERAMIC ELECTRONIC COMPONENT OF MULTILAYERED TYPE

BACKGROUND OF THE INVENTION

1. Field of the Invention

The present invention relates generally to a method of fabricating an electronic component utilizing a monolithic ceramic body, and more particularly, to a method of fabricating a multilayered type component having an improved process of forming inner electrodes.

2. Description of the Prior Art

Conventionally, a multilayer capacitor has been fabricated through the following processes.

First, ceramic green sheets formed in a sheet shape by the Doctor blade process are prepared. Conductive paste including metal to be inner electrodes, for example, palladium, silver-palladium or nickel is printed in a predetermined pattern on the upper surface of the ceramic green sheet by screen process printing. Generally, large ceramic green sheets are used, and the ceramic green sheets are laminated and then, cut in the later process, to fabricate a plurality of multilayer capacitors. Consequently, the above described conductive paste for forming inner electrodes is printed in a plurality of regions on the upper surface of the ceramic green sheet.

A plurality of ceramic green sheets each having conductive paste printed thereon are laminated and pressed in the direction of thickness. Thereafter, a laminated body obtained by pressing in the above described manner is cut in the direction of thickness so as to obtain laminated bodies to respectively constitute multilayer capacitors.

Each of the laminated bodies obtained is then fired, to obtain a sintered body. Thereafter, conductive paste for outer electrodes is applied and baked in a predetermined region on the surface of the sintered body, thereby to complete a multilayer capacitor.

In order to make the multilayer capacitor much smaller in size and larger in capacitance, the thickness of a ceramic layer between inner electrodes should be reduced.

If the ratio of the thickness of the ceramic layer to the thickness of the inner electrode after firing is made too small, however, a shrinkage of the ceramic layer is controlled by a shrinkage of the conductive paste at the time of firing. As a result, there arises the problem that the sintered body is cracked or the firing shrinkage percentage becomes unstable.

Furthermore, the conductive paste contains a solvent. The ceramic green sheet is swelled, or melted by the solvent. Accordingly, there are also problems of shortcircuiting the inner electrodes and decreasing the withstand voltage.

Therefore, a method of thinning the ceramic layer by using as an inner electrode a metal film obtained by the thin film forming process such as evaporation, sputtering or plating has been proposed. More specifically, the method is one for increasing the reliability in a case where the ceramic layer is thinned by not using relatively thick conductive paste but using a thin inner electrode formed by the thin film forming process.

However, the metal film itself formed by the thin film forming process has a small thickness. Accordingly, some problems are liable to arise. For example, the inner electrode is broken at the time of firing.

More specifically, the sintering temperature of the inner electrode formed by the thin film forming process is lower than that of the conventional inner electrode composed of conductive paste. Consequently, if the ceramic layer is raised to a temperature at which the ceramic layer is considerably sintered, the metal film shrinks, so that the inner electrode is liable to be broken.

In order to prevent the inner electrode from being broken, the alloying process is considered to raise the sintering temperature of metal or improve the wettability between metal and ceramics.

In the thin film forming process, however, it is difficult to form metal of the alloy composition to a thin film without any modification. In many cases, the alloy composition of the thin film formed largely differs from the intentional alloy composition. More specifically, it is very difficult to control the alloy composition. Consequently, it is very difficult to form inner electrodes of the desired alloy composition.

SUMMARY OF THE INVENTION

Therefore, an object of the present invention is to provide a method of easily fabricating a ceramic electronic component utilizing a monolithic body, having inner electrodes formed of metal thin films of the desired alloy composition.

The inventors of the present application zealously examined a process of obtaining inner electrodes formed of metal thin films of the above described desired alloy composition and consequently, discovered that a component of multilayered type provided with inner electrodes of the desired alloy composition can be fabricated not by directly forming the thin films from metal of the alloy composition but by laminating a plurality of thin films respectively having different metal compositions for constituting the alloy composition in accordance with the composition and alloying the laminated thin films at the time of firing ceramics, thereby to make the present invention.

The present invention provides a method of fabricating an electronic component of multilayered type having a structure in which a plurality of inner electrodes each composed of an alloy are overlapped with each other through ceramic layers in a ceramic sintered body, which is characterized by the following steps.

More specifically, the present invention is characterized by comprising the steps of sequentially laminating a plurality of metal films respectively having different metal compositions for constituting the alloy composition of an inner electrode by the thin film forming process to obtain a laminated metal film, laminating a plurality of ceramic green sheets with laminated metal films such that the laminated metal film is arranged between the ceramic green sheets to obtain a laminated body, firing the above laminated body and alloying the laminated metal films to form inner electrodes.

According to the present invention, a plurality of metal films are laminated to form a laminated metal film by the thin film forming process so as to achieve the alloy composition of an inner electrode. Metal particles in the laminated metal film obtained by the thin film forming process comprise ultrafine particles on the order of a nanometer so that the activity thereof is significantly high. Consequently, in the step of firing ceramics, the laminated metal film easily becomes an alloy of the desired composition. Accordingly, it is possible to easily fabricate an electronic component of multilayered type having inner electrodes of the desired alloy composition.

Therefore, according to the present invention, it is possible to obtain an electronic component of multilayered type superior in reliability, small in size and large in capacitance in which an inner electrode is not easily cut even if the thickness of the electrode is reduced and the thicknesses of a ceramic layer and the inner electrode can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A fabricating method according to one embodiment of the present invention will be described with reference to the drawings.

Figure 2:
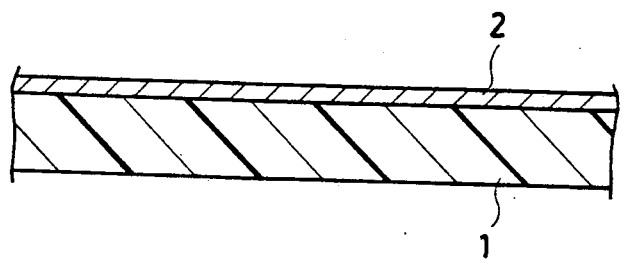
FIG. 2 is a portion cross sectional and broken view showing a state where a first metal film is formed on a film by the thin forming process.

First, as shown in a portion cross sectional and broken view of FIG. 2, a film 1 composed of polyethylene terephthalate is prepared. The film 1 may be composed of a material other than polyethylene terephthalate. More specifically, the film 1 may be composed of a material of synthetic resin other than polyethylene terephthalate or a material other than synthetic resin provided that it is not deformed at a temperature of approximately 75° C.

A first metal film 2 is formed on the film 1 by the thin film forming process. As a metal material composing the first metal film 2, a suitable metal material such as silver, palladium, nickel or copper is used. The composition of this first metal film 2 is selected to constitute the desired alloy composition of an inner electrode in combination with the composition of a second metal film as described later. As the thin film forming process, the known process such as evaporation, sputtering or plating is used.

Figure 3:
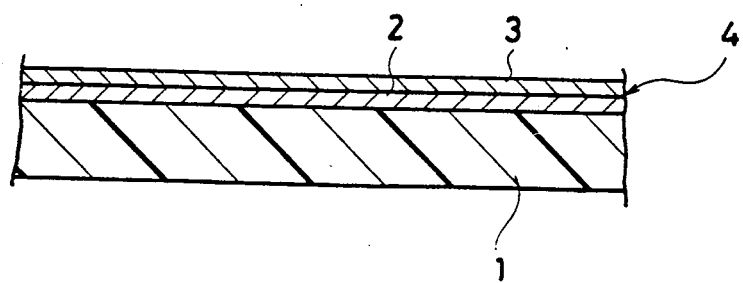
FIG. 3 is a portion cross sectional and broken view showing a state where a laminated metal film is formed on the film.

As shown in FIG. 3, a second metal film 3 having the composition different from that of the first metal film 2 is then formed on the first metal film 2 by the thin film forming process, to obtain a laminated metal film 4. The second metal film 3 is constructed to have the composition different from that of the first metal film 2 so as to achieve the alloy composition of an inner electrode as described later.

The ratio of the thicknesses of the above described first and second metal films 2 and 3 is selected in conformity with the desired alloy composition.

Figure 4:
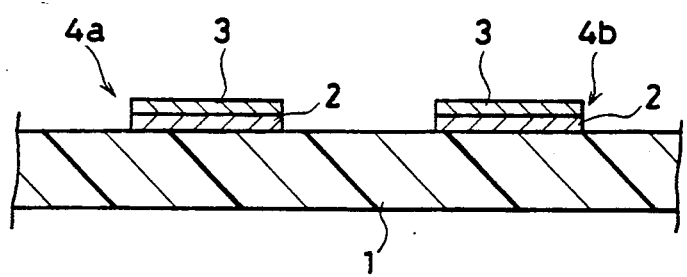
FIG. 4 is a portion cross sectional and broken view showing a state where the laminated metal film is patterned.

The laminated metal film 4 shown in FIG. 3 is then patterned as shown in FIG. 4, to form laminated metal films 4a, 4b, . . . . This patterning is possible by arranging a suitable resist material on the laminated metal film 4 and etching the same.

Figure 5:
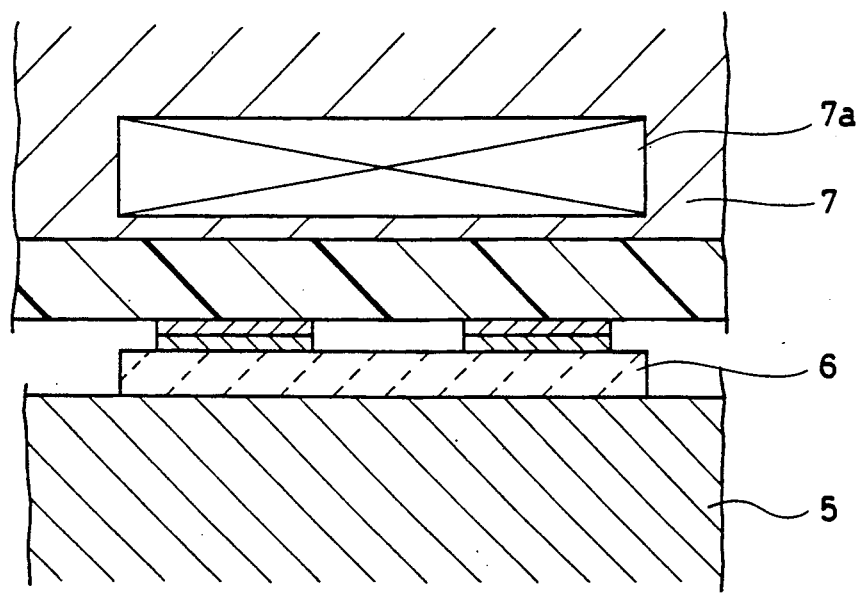
FIG. 5 is a portion cross sectional and broken view for explaining the process of transcribing laminated metal films to a ceramic green sheet.

The above described laminated metal films 4a and 4b are then transcribed to a ceramic green sheet. More specifically, as shown in FIG. 5, a ceramic green sheet 6 is deposited on a lower metal mold 5, and the film 1 shown in FIG. 4 is reversed and the ceramic green sheet 6 is coated with the film 1 such that the laminated metal films 4a and 4b are arranged on the ceramic green sheet 6. The ceramic green sheet 6, the laminated metal film 4a and 4b and the film 1 are pressed by an upper metal mold 7.

The upper metal mold 7 has a heater 7a in the inside thereof and is so constructed that the film 1 is heated to approximately 75° C. by the heater 7. Consequently, the laminated metal films 4a and 4b are transcribed to the ceramic green sheet 6 by this heat pressing. The pressure of the above pressing may be set to approximately 20 to 500 Kg/cm$^2$.

In the above described manner, the ceramic green sheet 6 having the laminated metal films 4a and 4b transcribed thereto is obtained. A plurality of ceramic green sheets having laminated metal films transcribed thereto are laminated, which will be described more concretely with reference to FIGS. 6A and 6B.

Figure 6A:
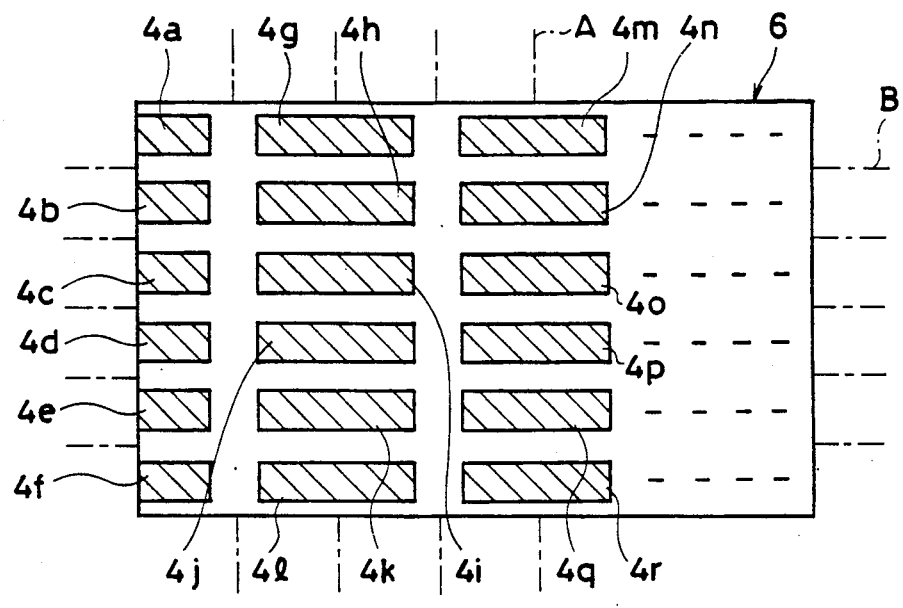
FIGS. 6A and 6B are plan views respectively showing ceramic green sheets each having laminated metal films transcribed thereto.
Figure 6B:
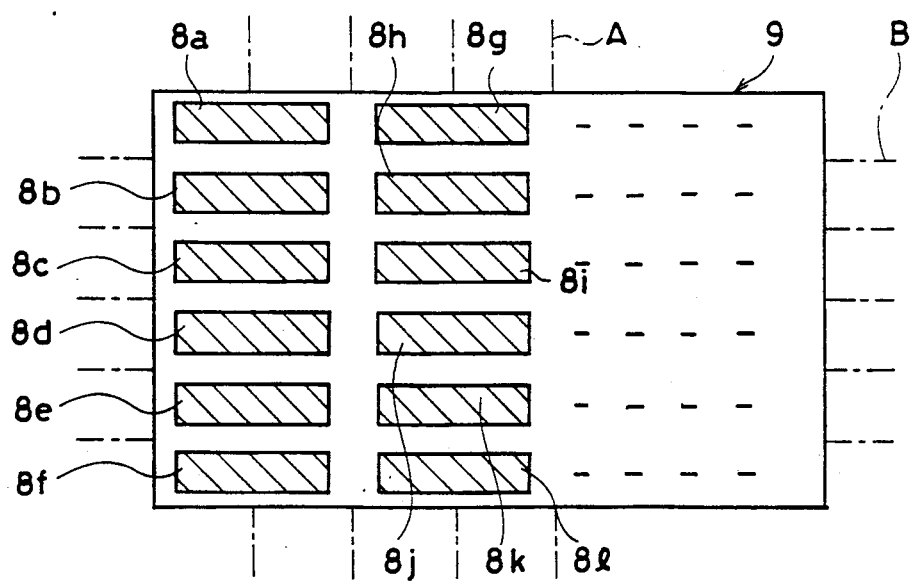

FIGS. 6A and 6B are plan views respectively showing ceramic green sheets each having laminated metal films formed in a plurality of regions thereof. More specifically, laminated metal films 4a to 4r are transcribed to a ceramic green sheet 6 shown in FIG. 6A. Similarly, a ceramic green sheet 9 having laminated metal films 8a to 8l transcribed thereto is prepared, as shown in FIG. 6B. A plurality of ceramic green sheets 6 and 9 are alternately laminated and a laminated body thus obtained is cut by portions corresponding to portions along one dot and dash lines A and B shown in FIGS. 6A and 6B, thereby to obtain a plurality of laminated bodies.

Figure 1:
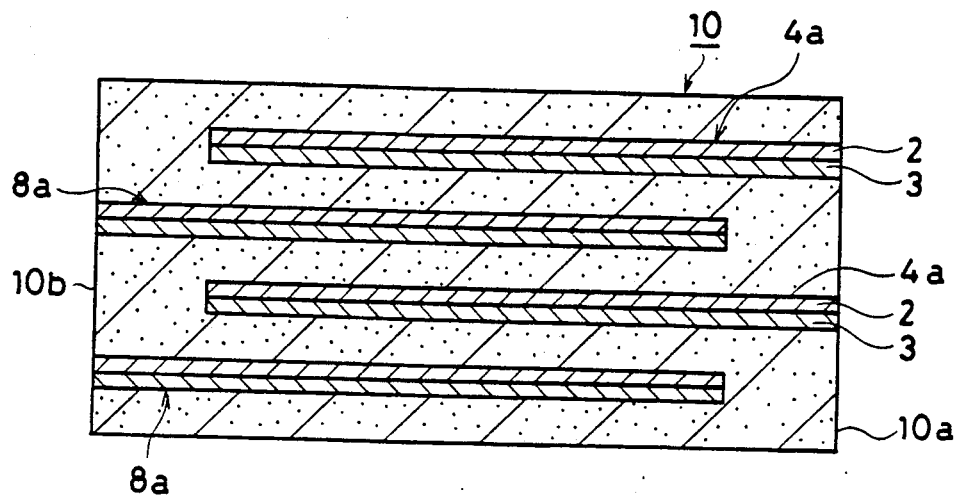
FIG. 1 is a cross sectional view showing a laminated body obtained by laminating ceramic green sheets each having laminated metal films transcribed thereto according to one embodiment of the present invention.

One of the laminated bodies obtained is shown in a cross sectional view of FIG. 1. Laminated metal films 4a, 8a, 4a and 8a are laminated through ceramic green sheet layers in a laminated body 10. The laminated metal films 4a and 4a are led out to one end surface 10a of the laminated body 10, and the laminated metal films 8a and 8a are led out to the other end surface 10b.

Figure 7:
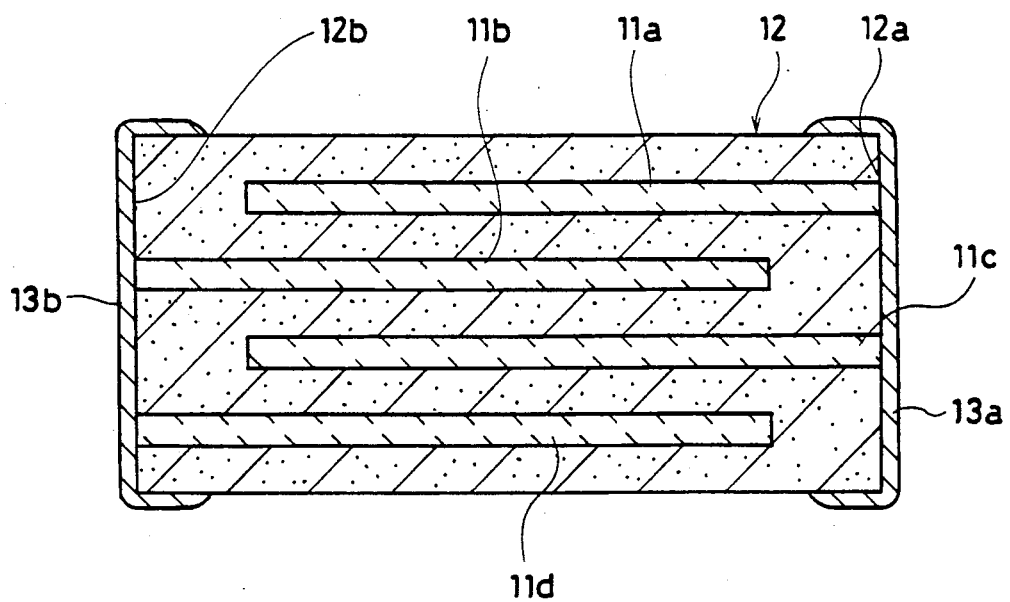
FIG. 7 is a cross sectional view showing a multilayer capacitor obtained by a fabricating method according to one embodiment of the present invention.

The laminated body 10 is then fired in the same manner as that in the known method of fabricating a multilayer capacitor. By this firing, ceramics composing the laminated body 10 is fired to obtain a sintered body 12 and the laminated metal films 4a, 4a, 8a and 8a are alloyed, to form inner electrodes 11a to 11d, as shown in FIG. 7. First and second metal films constituting the laminated metal film are formed by the thin film forming process. Accordingly, metal particles in each of the metal films comprise ultrafine particles on the order of a nanometer so that the activity thereof is significantly high. Consequently, at the time of alloying, the laminated metal film reliably and easily becomes an alloy of the desired composition.

Finally, both end surfaces 12a and 12b of the sintered body 12 are coated with conductive paste, followed by firing, thereby to form outer electrodes 13a and 13b. The known process of forming outer electrodes of a multilayer capacitor can be used for this formation of the outer electrodes 13a and 13b.

Although in the above described embodiment, the plurality of ceramic green sheets 6 and 9 shown in FIGS. 6A and 6B are laminated, a laminated body may be obtained by repeating the process of laminating a plain ceramic green sheet on a ceramic green sheet having laminated metal films transcribed thereto and then, transcribing the laminated metal films to the plain ceramic green sheet.

Further, as a method different from that in the above described embodiment, the above described laminated body may be obtained by repeating the process of forming a laminated metal film on a film and then, forming and laminating a ceramic green sheet on the laminated metal film and integrally transcribing the laminated metal film and the ceramic green sheet which are laminated on the film.

Furthermore, although in the above described embodiment, the relatively large ceramic green sheets 6 and 9 are laminated and the laminated body thus obtained is cut in the portions corresponding to the portions along the one dot and dash lines A and B shown in FIGS. 6A and 6B to obtain a plurality of laminated bodies, small ceramic green sheets may be used to form a laminated body.

Additionally, a laminated metal film may be one obtained by laminating three or more metal films.

Although the above described embodiment concerns a method of fabricating a multilayer capacitor, the present invention can be also applied to the fabrication of other electronic components of multilayered type, for example, a monolithic resistor which is disclosed in U.S. Pat. No. 4,290,041. Therefore, the above described U.S. Pat. No. 4,290,041 is incorporated by reference herein for the processes other than the process of forming inner electrodes which characterizes the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of fabricating an electronic component of multilayered type having a structure in which a plurality of inner electrodes each composed of an alloy are arranged in a ceramic sintered body so as to be overlapped with each other through ceramic layers, comprising the steps of:

sequentially laminating a plurality of metal films respectively having different metal compositions for constituting the alloy composition of an inner electrode by the thin film forming process, to obtain a laminated metal film;

laminating a plurality of ceramic green sheets with laminated metal films such that the laminated metal film is arranged between the ceramic green sheets, to obtain a laminated body; and firing said laminated body and thereby alloying the laminated metal films to form the inner electrodes.

2. The method according to claim 1, wherein said step of obtaining a laminated metal film is performed by sequentially forming and laminating said plurality of metal films on a film by the thin film forming process.

3. The method according to claim 2, wherein said laminated body is obtained by transcribing the laminated metal film formed on said film to one major surface of a ceramic green sheet and laminating a plurality of ceramic green sheets each having the laminated metal film transcribed thereto.

4. The method according to claim 3, wherein said laminated body is obtained by also laminating ceramic green sheet or sheets having no laminated metal film transcribed thereto in addition to the plurality of ceramic green sheets each having the laminated metal film transcribed to its one major surface.

5. The method according to claim 3, which further comprising the steps of:

patterning said laminated metal film, to form a plurality of laminated metal film portions, and transcribing said plurality of laminated metal film portions to the ceramic green sheet and cutting in the direction of thickness a laminated body obtained by laminating a plurality of ceramic green sheet each having the plurality of laminated metal film portions transcribed thereto, thereby to obtain a plurality of laminated bodies.

6. The method according to claim 2, which further comprises the step of laminating a second ceramic green sheet on said ceramic green sheet having the laminated metal film transcribed thereto and transcribing the laminated metal film on the upper surface of the second ceramic green sheet, said step being repeated to obtain said laminated body.

7. The method according to claim 2, wherein said step of obtaining a laminated body is performed by repeating the process of forming a ceramic green sheet on a laminated metal film formed on said film and then, transcribing the laminated metal film and the ceramic green sheet which are laminated and formed on the film.

* * * * *